Oct. 24, 1933.     S. R. LARGE     1,931,871
ANTIFRICTION BEARING AND MOUNTING
Filed Jan. 11, 1929

INVENTOR:
SAMUEL R. LARGE,
BY Gales P. Moore
HIS ATTORNEY.

Patented Oct. 24, 1933

1,931,871

UNITED STATES PATENT OFFICE 1,931,871

ANTIFRICTION BEARING AND MOUNTING

Samuel Robert Large, Bristol, Conn., assignor to The New Departure Manufacturing Company, Bristol, Conn., a corporation of Connecticut Application January 11, 1929. Serial No. 331,835

3 Claims. (Cl. 308—230).

This invention relates to antifriction bearings and mountings and comprises all the features of novelty herein disclosed. An object of the invention is to provide an improved antifriction bearing for resisting thrust and radial loads, with thrust capacity predominating. Another object is to provide a bearing and mounting having improved safety features. Another object is to provide improved means for retaining the parts of a thrust and radial load bearing in assembled relation. To these ends and to improve generally and in detail upon devices of this general character, the invention also consists in the various matters hereinafter disclosed and claimed.

Figure 1:
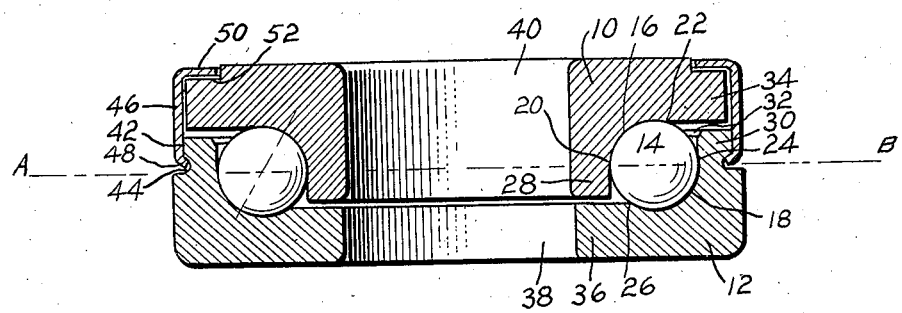
Figure 2:
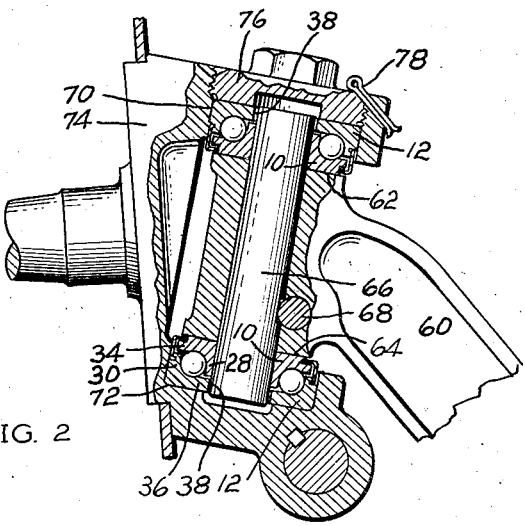

In its broader aspects, the invention is not necessarily limited to the specific construction selected for illustrative purposes in the accompanying drawing in which Fig. 1 is an axial section of the bearing and Fig. 2 is a sectional view of a preferred mounting for the bearing.

The bearing comprises an inner race ring 10, an outer race ring 12, and a circular and continuous series of balls 14. The inner race ring has an arcuate raceway 16 and the outer race ring has a confronting arcuate raceway 18, each raceway having a radius of curvature slightly larger than that of the balls and preferably surrounding the balls for an angular distance greater than 90°. The raceways are arranged to provide a high angle of contact (herein shown as about 60°) with respect to a diametrical plane A—B through the circle of balls. The arcuate raceway 16 extends from a point 20, preferably in the diametrical plane A—B, to a terminal point 22 which lies outside of a cylinder containing the centers of all the balls. The arcuate raceway 18 extends from a terminal point 24, preferably in the diametrical plane A—B, to a terminal point 26 which lies inside of the cylinder containing the ball centers. Thus the bearing is well adapted for loads wherein a heavy thrust load predominates yet a goodly radial load can also be resisted.

The inner race ring has a straight axial extension 28 projecting in one direction from the inner terminus 20 of its raceway at the diametrical plane A—B and the outer race ring has an axial extension 30 projecting in the opposite direction from the diametrical plane. The extension 30 preferably extends straight out from the outer terminus 24 of its raceway to a small chamfer 32. The inner race ring also has a straight radial extension 34 projecting radially outwards from the outer terminus 22 of its raceway across and close to the end of the axial extension 30 of the outer raceway. The outer race ring has a straight radial extension 36 projecting radially inwardly from the inner terminus 26 of its raceway across and close to the end of the axial extension 28 of the inner raceway. This extension 36 has an inner periphery or bore 38 which is slightly larger than the bore 40 of the inner race ring to have clearance with any shaft or stud which may carry the inner race ring.

The axial extension 30 of one of the race rings, herein shown as the outer ring, has its periphery reduced at 42 from the end to a communicating deeper groove 44. A shell or casing 46, preferably of brass, fills the reduced periphery at 42 nearly flush with the uncut portion of the periphery and its end 48 is pressed or spun into the groove 44. The shell clears the radial extension 34 and has a bent end portion 50 which enters a notch 52 to loosely enclose a portion of the inner race ring and hold the bearing assembled. The shell also forms in effect a labyrinth seal to retain grease and exclude foreign matter.

The bearing is particularly adapted for use with steering knuckles of automobiles wherein a heavy thrust load lengthwise of the king pin predominates most of the time but where considerable radial load occurs occasionally because of the vehicle going around curves, skidding, or running in ruts. The radial capacity of the bearing eliminates the need for the usual plain bushings used with an ordinary thrust bearing. In Fig. 2 an axle 60 having upper and lower flat faces 62 and 64 is bored for a king pin 66 secured by a locking pin 68. Two thrust bearings of the character described above are mounted with the bores of their inner race rings 10 fitting the studs provided by the ends of the king pin and with their radial faces resting against the axle faces 62 and 64. The outer race rings 12 are fitted in circular seats or recesses 70 and 72 of a steering knuckle 74, the radial face of the lower race ring 12 resting against the bottom of the recess 72 and the radial face of the upper race ring 12 resting against a detachable abutment in the form of an adjusting nut 76 which closes the upper recess 70 and is locked by a cotter pin 78 traversing aligned openings in the nut and steering knuckle. The studs afforded by the ends of the king pin project into but just clear the bores 38 of the race rings 12 so that, in case of failure of the balls for any reason, the studs will form plain radial bearings for the knuckle while the ends of the axial extensions 28 and 30 of the race rings will engage the opposing radial extensions 36 and 34 and form plain thrust surfaces, thereby promoting safety.

I claim:

1. In an angular-contact bearing, the combination with a race of balls, of co-operating race-members each of which has a ball-engaging race-surface that extends across a ball's circumference from approximately the plane that includes the ball-centers to a point approximately ninety degrees removed from said plane, said race portions of the respective said race-members being upon opposite sides of the said race of balls and extending oppositely to each other, and the balls contacting with said races in lines oblique to the axis of rotation of the bearing and at points in the middle zone of the said portions of the ball's circumference across which said race-surfaces extend as aforesaid, whereby ball injury due to contact with the end of a race-member is avoided; substantially as described.

2. In an angular contact bearing, co-operating race-members and an interposed race of balls contacting therewith in lines oblique to the axis of rotation of the bearing and at points in the middle zone of that portion of the ball's circumference across which the raceways of said race-members extend, each said race-member having angularly-related body-portions that extend beyond the zones of ball-contact, said portions upon one said race-member extending close to and overlapping said portions upon the other said race-member, one of said extending portions of one said race-member being of less external diameter than the remainder of said race-member, and the other of said race-members having a recess in its outer face at the periphery thereof and being of less external diameter than is said reduced diameter of the other said race-member, and a shield secured to said last-mentioned race-member and extending across the periphery of said race-member of smaller external diameter and being bent into said recess of the latter, said shield clearing said last-mentioned race-member and lying within the maximum exterior lines of the bearing as a whole; substantially as described.

3. In a bearing mounting, the combination with a supporting stud, of a race-member supported thereupon, a co-operating bored race-member about said stud, and rolling-members between said race-members, said race-member upon said stud having axial extensions, the other said race-member having radial extensions overlapping and in proximity to the said axial extensions, and the bore-surface of said last-mentioned race-member being removed from but close to the periphery of said stud, whereby upon failure of said rolling-members the said overlapping extensions and the said stud and bore-surface can constitute co-operating bearing surfaces; substantially as described.

SAMUEL ROBERT LARGE.